United States Patent
Rager et al.

(10) Patent No.: US 9,283,993 B2
(45) Date of Patent: Mar. 15, 2016

(54) DRIVER'S CAB SUSPENSION

(71) Applicant: The Pullman Company, Milan, OH (US)

(72) Inventors: Christopher G. Rager, Huron, OH (US); Matthew G. Wieczorek, Norwalk, OH (US); Jorge T. Tinnirello, Monroe, MI (US)

(73) Assignee: The Pullman Company, Milan, OH (US)

( * ) Notice: Subject to any disclaimer, the term of this patent is extended or adjusted under 35 U.S.C. 154(b) by 337 days.

(21) Appl. No.: 13/899,900

(22) Filed: May 22, 2013

(65) Prior Publication Data

US 2013/0313858 A1 Nov. 28, 2013

Related U.S. Application Data

(60) Provisional application No. 61/650,057, filed on May 22, 2012.

(51) Int. Cl.
*B62D 33/067* (2006.01)
*B62D 24/04* (2006.01)
*B62D 33/06* (2006.01)
(Continued)

(52) U.S. Cl.
CPC ............ *B62D 24/04* (2013.01); *B62D 33/0608* (2013.01); *F16F 1/3828* (2013.01); *F16F 1/3873* (2013.01)

(58) Field of Classification Search
CPC ... B62D 24/04; B62D 33/0608; F16F 1/3828; F16F 1/3873
USPC ........................... 296/190.04, 190.05, 190.07
See application file for complete search history.

(56) References Cited

U.S. PATENT DOCUMENTS

| 3,606,437 | A | * | 9/1971 | Pierce | 296/35.1 |
| 3,944,017 | A | * | 3/1976 | Foster | 180/89.15 |
| 4,638,878 | A | * | 1/1987 | Komp | 180/89.13 |

(Continued)

FOREIGN PATENT DOCUMENTS

| EP | 0863066 A1 | 9/1998 |
| JP | 05-229458 | 9/1993 |

(Continued)

OTHER PUBLICATIONS

Search Report and Written Opinion dated Sep. 6, 2013 in the corresponding PCT Application No. PCT/US2013/042237 (10 pages).

*Primary Examiner* — Jason S Morrow
*Assistant Examiner* — E Turner Hicks
(74) *Attorney, Agent, or Firm* — Harness, Dickey & Pierce, P.L.C.

(57) ABSTRACT

A pair of front couplings and a pair of rear air spring over shocks couple the cab to the vehicle frame. A motion control link includes a central base and pair of arms extending longitudinally from the central base. A base coupling directly couples the base to the vehicle frame. A rear arm coupling for each arm directly couples the arm to the rear of the cab. The rear base coupling and the rear arm coupling essentially restrict lateral movement of the motion control link and permit tuned lateral movement of the frame relative to the rear of the cab to provide lateral motion control at the rear of the cab. The motion control link defines an arc that intersects the front coupling arc. The rear arm couplings include a rear elastomeric bushing member including voids to accommodate for the intersecting arcs.

19 Claims, 6 Drawing Sheets

(51) Int. Cl.
*F16F 1/38* (2006.01)
*F16F 1/387* (2006.01)

(56) References Cited

U.S. PATENT DOCUMENTS

| | | | | |
|---|---|---|---|---|
| 4,989,684 A | * | 2/1991 | Conaway | 180/89.15 |
| 5,044,455 A | * | 9/1991 | Tecco et al. | 180/89.13 |
| 5,299,651 A | * | 4/1994 | Wilson | 180/89.12 |
| 6,073,714 A | * | 6/2000 | McHorse et al. | 180/89.14 |
| 6,206,121 B1 | | 3/2001 | Michel | |
| 6,270,282 B1 | | 8/2001 | McLaughlin | |
| 6,439,651 B1 | * | 8/2002 | Johansson et al. | 296/190.07 |
| 7,798,503 B2 | | 9/2010 | McLaughlin et al. | |
| 7,883,097 B1 | | 2/2011 | Johnston et al. | |
| 8,371,562 B2 | | 2/2013 | Knevels | |
| 8,453,787 B2 | | 6/2013 | Rager et al. | |

FOREIGN PATENT DOCUMENTS

| | | |
|---|---|---|
| KR | 10-2011-0028481 | 3/2011 |
| WO | 95/23725 A1 | 9/1995 |

* cited by examiner

DRIVER'S CAB SUSPENSION

CROSS-REFERENCE TO RELATED APPLICATIONS

This application claims the benefit of U.S. Provisional Application No. 61/650,057, filed on May 22, 2012. The above application is hereby incorporated herein by reference in its entirety.

FIELD

The present disclosure relates to driver's cab suspensions for trucks or similar vehicles.

BACKGROUND

This section provides background information related to the present disclosure which is not necessarily prior art.

Many driver's cab suspension systems are utilized that couple the cab to the vehicle frame to allow movement necessary for good ride characteristics. While allowing such movement, cab suspension systems also must counteract or limit potentially problematic movements relative to the frame, including lateral (or side-to-side), longitudinal (or fore/aft), vertical (or up/down), and torsional (or roll) forces and relative movements.

Some of these systems employ air spring over strut technology. Although the use of struts can manage several of the relative movements without requiring a large number of additional components, such struts are relatively costly and bulky. As a result, it is not possible or desirable to use them in some applications.

Some systems employ air spring over shock technology. Although less expensive, shocks do not have the capacity to manage as many forces and relative movements as struts. As a result, the use of shocks typically requires the use of multiple additional components to manage all of the various forces and relative movements.

For example, to manage relative lateral movements between the cab and frame a laterally extending panhard or track bar can be provided. To manage torsional (or roll) forces and relative movements, a U-shaped stabilizer bar that twists along its length allowing one end to move down while another end moves up can be provided. A link member or spring is typically provided between each end of such stabilizer bar and the cab to permit the twisting and relative end movement of the stabilizer bar. To manage longitudinal forces and relative movements, additional components can be provided. It may even be necessary to provide further cab-to-frame coupling components to meet current cab retention standards under 200 impact testing. All of these components can significantly increase costs and space requirements.

SUMMARY

This section provides a general summary of the disclosure, and is not a comprehensive disclosure of its full scope or all of its features, nor should every feature noted herein be considered an essential feature of the disclosure.

In one aspect of the present disclosure, a driver's cab suspension includes a pair of front couplings between a front of the cab and a vehicle frame. The front couplings are aligned along a front laterally extending axis around which the cab rotates in a front coupling arc. A pair of rear air spring over shocks couples a rear of the cab to the vehicle frame. A motion control link includes a central base and pair of arms extending longitudinally from the central base. A rear base coupling directly couples the base to one of the vehicle frame and a rear of the cab. A rear arm coupling for each arm directly couples the arm to the other of the vehicle frame and the rear of the cab. The rear base coupling and the rear arm coupling essentially restrict lateral movement of the motion control link and permit tuned lateral movement of the frame relative to the rear of the cab to provide lateral motion control at the rear of the cab. The motion control link is rotationally coupled between the vehicle frame and the rear of the cab with the arms rotating about a rear laterally extending axis adjacent the frame and defining a motion control link arc that intersects the front coupling arc. At least one of the rear base member coupling and the rear arm couplings includes a rear elastomeric bushing member enabling the cab to simultaneously rotate around both the front laterally extending axis and the rear laterally extending axis as the rear of the cab moves vertically to provide vertical motion control of the rear of the cab together with the air springs over shocks.

In another aspect of the present disclosure, driver's cab suspension includes a pair of front couplings between a front of the cab and a vehicle frame. The front couplings are aligned along a front laterally extending axis around which the cab rotates along a rearwardly extending coupling arc. A pair of rear air springs over shocks couple a rear of the cab to the vehicle frame. A motion control link includes a laterally extending base and pair of arms extending forwardly from the base. A rear frame coupling rotationally couples the base to the vehicle frame while essentially restricting lateral movement of the motion control link relative to the frame. A rear cab coupling for each arm rotationally couples the arm to a rear of the cab and includes a rod member coupled to a fixed cab member with the rod member extending through an elastomeric cab bushing member. Engagement between a protruding portion of the elastomeric cab bushing member and a surface of the fixed cab member progressively limits lateral movement of the rear of the cab relative to the motion control link. The motion control link, the rear frame coupling, and the rear cab coupling, in combination, provides tuned lateral motion control at the rear of the cab relative to the frame. An arc length is defined between a laterally extending central axis of the base and a laterally extending central axis of the rod member. The elastomeric cab bushing member of each rear arm coupling includes at least one void enabling the arc length to change sufficiently to accommodate for simultaneous rotation of the cab around both the front laterally extending axis and the rear laterally extending axis as the rear of the cab moves vertically to provide tuned vertical motion control of the rear of the cab together with the air spring over shocks.

In yet another aspect of the present disclosure, a driver's cab suspension includes a pair of front couplings between a front of the cab and a vehicle frame. Each front coupling includes a laterally extending front rod member coupled to a front fixed cab member. Each front rod member extends through a front elastomeric cab bushing member. Each elastomeric front bushing member includes at least one void in a space between the laterally extending front rod member and an outer collar of the respective front coupling that provides tuned vertical movement of the front of the cab relative to the frame. A pair of rear air spring over shocks couple a rear of the cab to the vehicle frame. A motion control link includes a base and pair of arms extending from the base. A base coupling rotationally couples the base to one of a rear of the cab and the vehicle frame and essentially restricts lateral movement of the motion control link relative to the frame and the one of the rear of the cab and the vehicle frame. A rear arm coupling is between a distal end of each arm and the other of the one of the rear of the cab and the vehicle frame. Each rear arm coupling includes a laterally extending rear rod member coupled to a rear fixed member of the other of the one of the rear of the cab and the vehicle frame. Each rear rod member extends through an elastomeric rear bushing member. A generally annular protruding portion of each elastomeric rear bushing member engages an opposing surface of the rear fixed member to progressively resist lateral movement of the rear of the cab relative to the vehicle frame as the generally annular protruding portion is compressed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
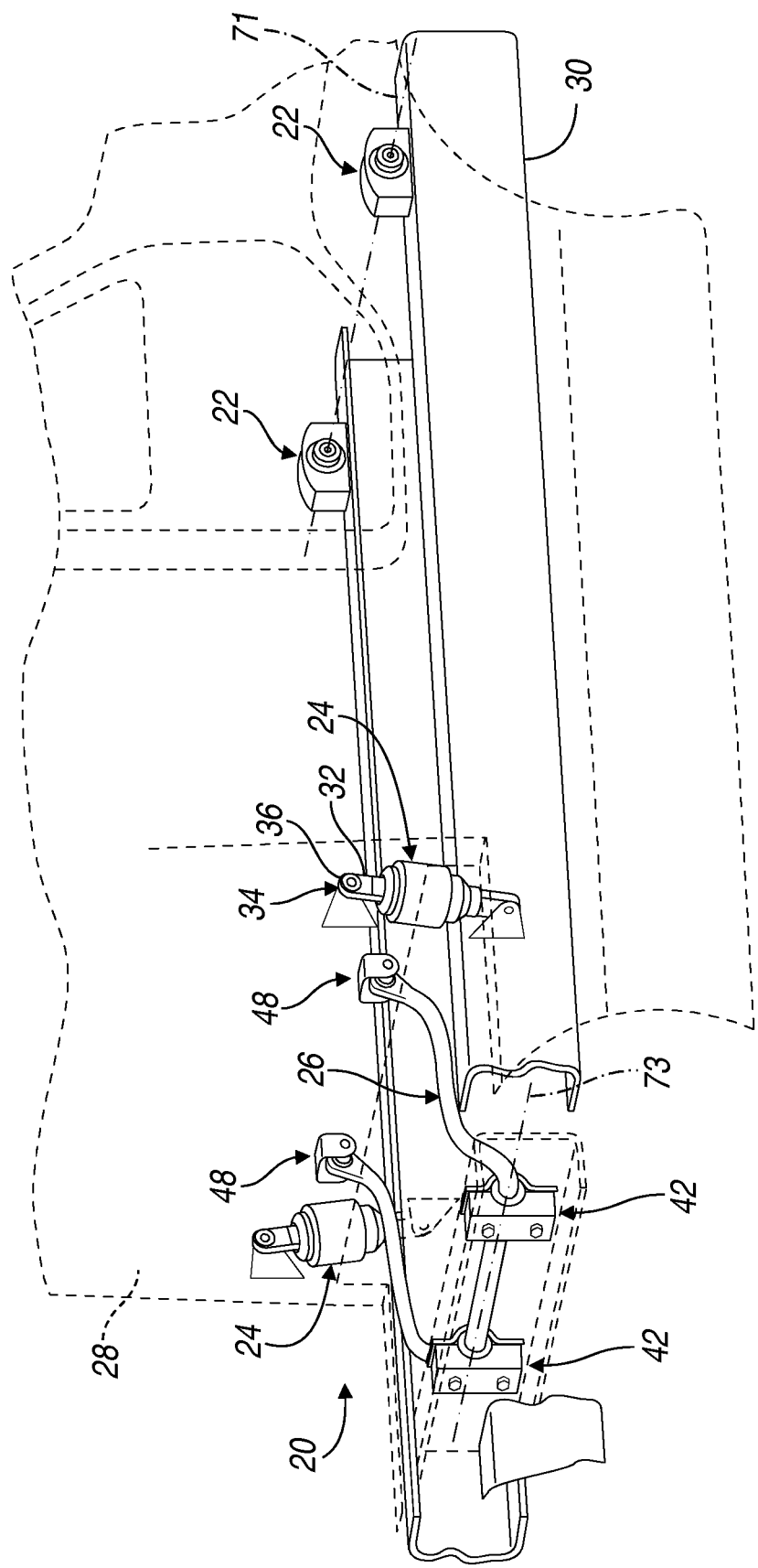
FIG. 1 is a side perspective view of a vehicle incorporating an exemplary driver's cab suspension system in accordance with the present disclosure.
Figure 2:
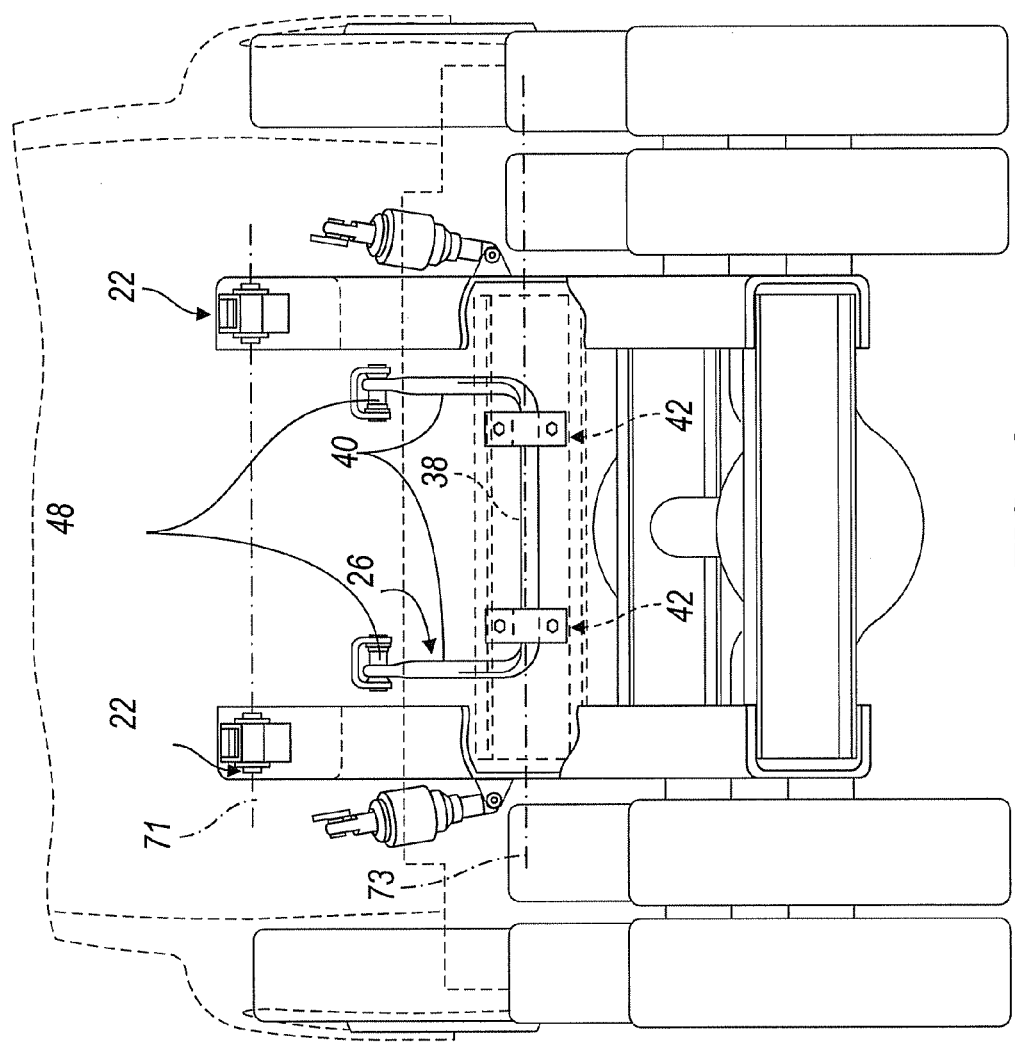
FIG. 2 is a rear perspective view of the exemplary driver's cab suspension system of FIG. 1.

Example embodiments will now be described more fully with reference to the accompanying drawings.

Referring to FIGS. 1-5, one exemplary suspension system 20 of the present disclosure generally includes a pair of front couplings 22, a pair of air springs over shocks 24, and a motion control link 26, each mounted between the driver's cab 28 and the vehicle frame 30.

Each coupling end 32 of each air spring over shock 24 can be fixedly positioned relative to the cab 28 or frame 30 to which the coupling end 32 is joined. In other words, there is no movable link or spring operable between each fixed coupling end 32 and the cab 28 or frame 30. For example, coupling end 32 of coupling 34 may include a fixed shaft extending through an aperture in an elastomeric bushing 36 as the fixed coupling end 32 that is fixed relative to the cab 28 or frame 30 to which it is joined. Thus, coupling end 32 can be directly coupled a fixed member of the frame 30. The air spring over shocks 24 provide the vertical motion control of the cab 28 relative to the frame 30 at the rear of the cab 28. The air spring over shocks 24 can be operably coupled to a controller 25 to provide driver selectable vertical motion control of the cab 28 relative to the frame 30.

The motion control link 26 provides the motion control at the rear of the cab 28 for all other motions. The other controlled motions are lateral (or side-to-side), longitudinal (or fore/aft), and torsional (or roll) movements of the cab 28 relative to the frame 30.

The motion control link 26 can have a generally C-shaped configuration, including a laterally extending base 38 and pair of arms 40 extending from opposite ends of the base 38. Related to providing the lateral motion control at the rear of the cab 28, the base 38 of the motion control link 26 is coupled to the frame 30 using one or more couplings 42 that can effectively prevent lateral movement of the motion control link 26 relative to the frame 30.

Figure 3B:
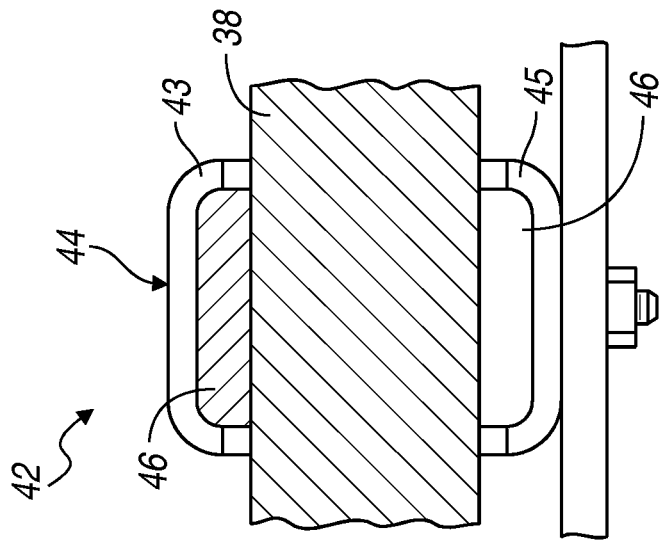
FIG. 3B is a cross-sectional view of the coupling of FIG. 3A taken through line 3B-3B of FIG. 3A.
Figure 3A:
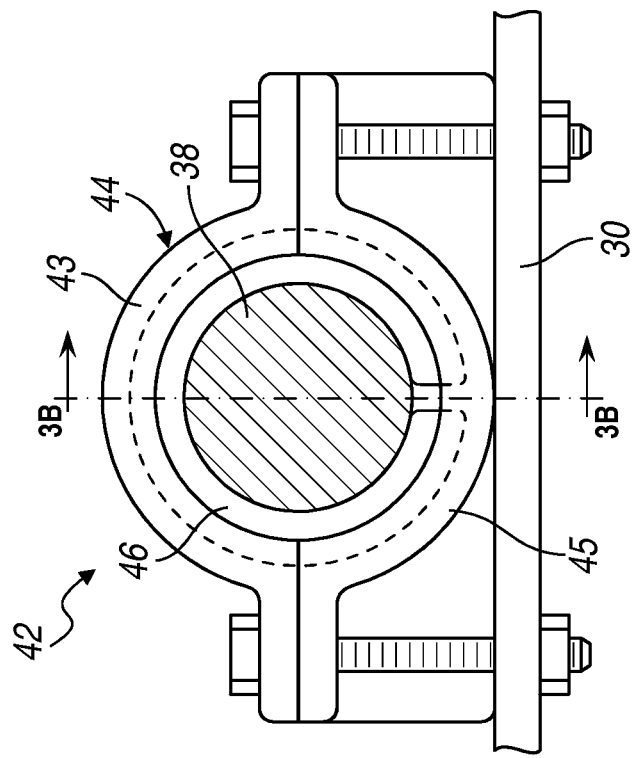
FIG. 3A is a side view of a coupling of the exemplary driver's cab suspension system of FIG. 1.

With particular reference to FIGS. 3A and 3B, in some cases such couplings 42 can include an outer clamshell housing 44, including housing members 43 and 45, that can surround and clamp a substantially annular elastomeric bushing 46 around the base 38 at a predetermined compression wherein axial movement of the base 38 relative to the clamshell housing 44 is effectively prevented. Examples of such couplings 42 are disclosed in U.S. Pat. No. 6,513,801, which issued to McCarthy on Feb. 4, 2003, U.S. Pat. No. 6,755,403, which issued to Lewis et al. on Jun. 29, 2004, and U.S. Pat. No. 7,114,712, which issued to Lewis et al. on Oct. 3, 2006, each of which is hereby incorporated herein by reference in its entirety. Such exemplary couplings 42 can essentially prohibit or restrict lateral movement of the motion control link 26 relative to the frame 30.

Figure 4:
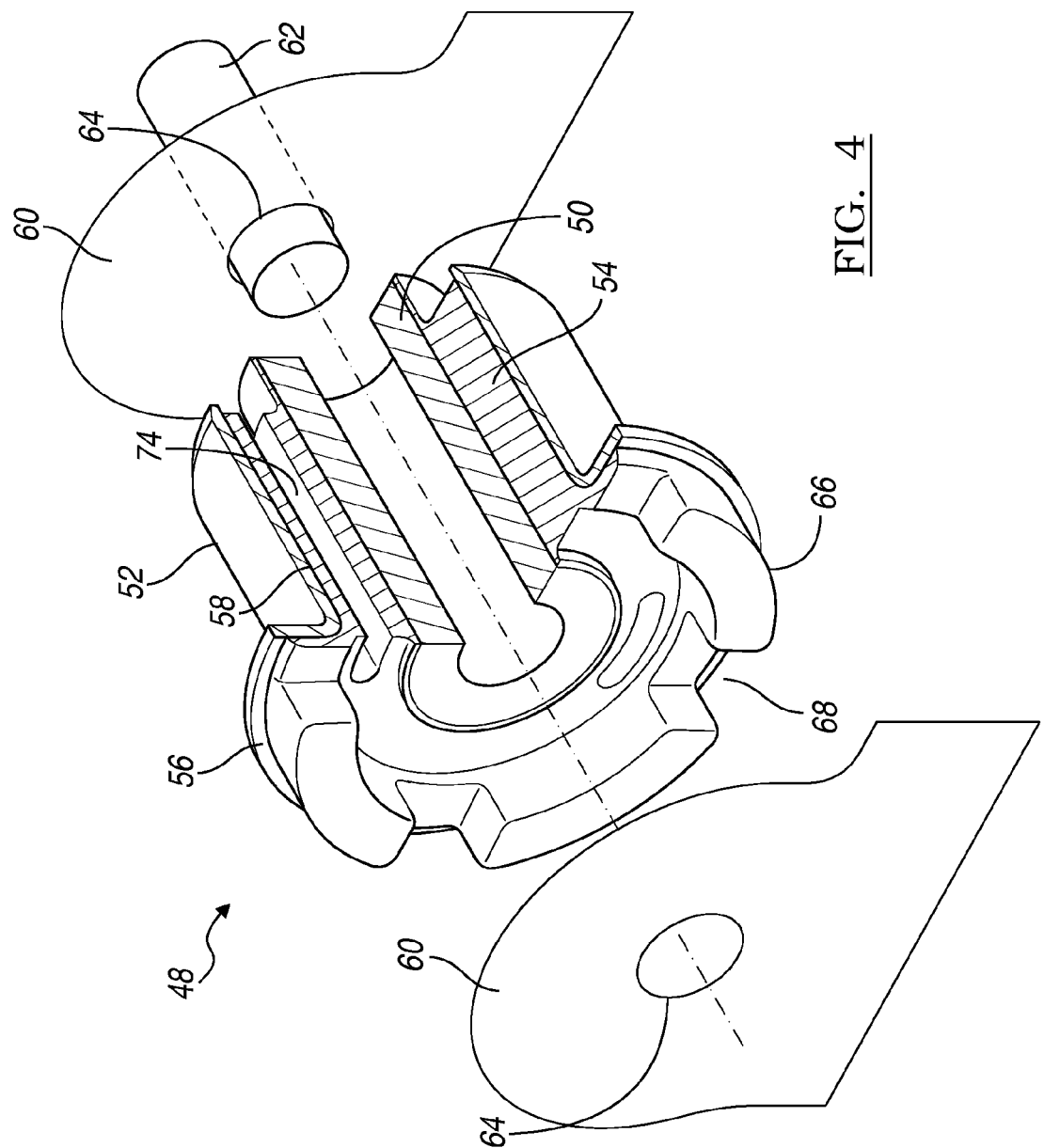
FIG. 4 is an exploded perspective view of another coupling of the exemplary driver's cab suspension system of FIG. 1.

The distal end of each arm 40 of the motion control link 26 can be coupled to the rear of the cab 28 via couplings 48 that provide lateral motion control at the rear of the cab 28. An example of such a coupling 48 is shown in FIG. 4. Lateral motion control couplings 48 can include an inner coupling member 50 and an outer collar member 52. An elastomeric bushing member 54 can be disposed between the inner and outer members 50 and 52, respectively. The inner coupling member 50 can be an elongated annular member.

The outer collar member 52 can include an annular surface 56 surrounding an elongated aperture 58. For example, the outer collar member 52 can simply be an elongated aperture 58 through the distal end of the arm 40 of the motion control link 26, with the annular surface 56 simply being provided by a surface of the motion control link 26 surrounding the elongated aperture 58 in the end of the arm 40.

Each coupling 48 can include a pair of fixed surfaces 60 of the cab 28. A fixed shaft member 62, such as a bolt, can extend through the inner coupling member 50 and can be directly coupled to the fixed surfaces 60 through apertures 64 therein. An annular, elastomeric protruding portion 66 of the inner coupling member 50 can engage against fixed surface 60 (e.g., on the side of the coupling 48 as illustrated in FIG. 4). Thus, each coupling 48 of the motion control link 26 can be fixedly positioned relative to the cab 28. Specifically in this example, there is no movable link or spring operable between the inner member 50 operating as the fixed coupling end of each coupling 48 between the motion control link 26 and the fixed surfaces 60 of the cab 28. Alternatively, each coupling 48 can simply include a bolt 62 extending through an aperture (without inner member 50) in the elastomeric bushing 54.

The elastomeric bushing member 54 can include the protruding portion 66, which may be sandwiched between the annular surface 56 and the opposing fixed surface 60 (on the left side of the coupling 48 as illustrated in FIG. 4). The protruding portion 66 can have an annular shape with external voids 68. As illustrated, the voids 68 are external such that the annular shaped protrusion 66 is formed of a plurality of protruding annular segments with voids 68 between the annular segments. As should be apparent, by adjusting the size, shape, and material of the elastomeric protruding portion 66, including the size of the voids 68, the lateral motion control link 26 can be coupled between the frame 30 and cab 28 to provide tuned lateral movement of the rear of the cab 28 relative to the frame 30 to provide lateral motion control at the rear of the cab 28. In addition, the protruding portion 66 can provide dynamic lateral motion control, such as progressive lateral motion control where the resistance to lateral motion progressively increases as the lateral distance from the neutral or home position increases.

Figure 5:
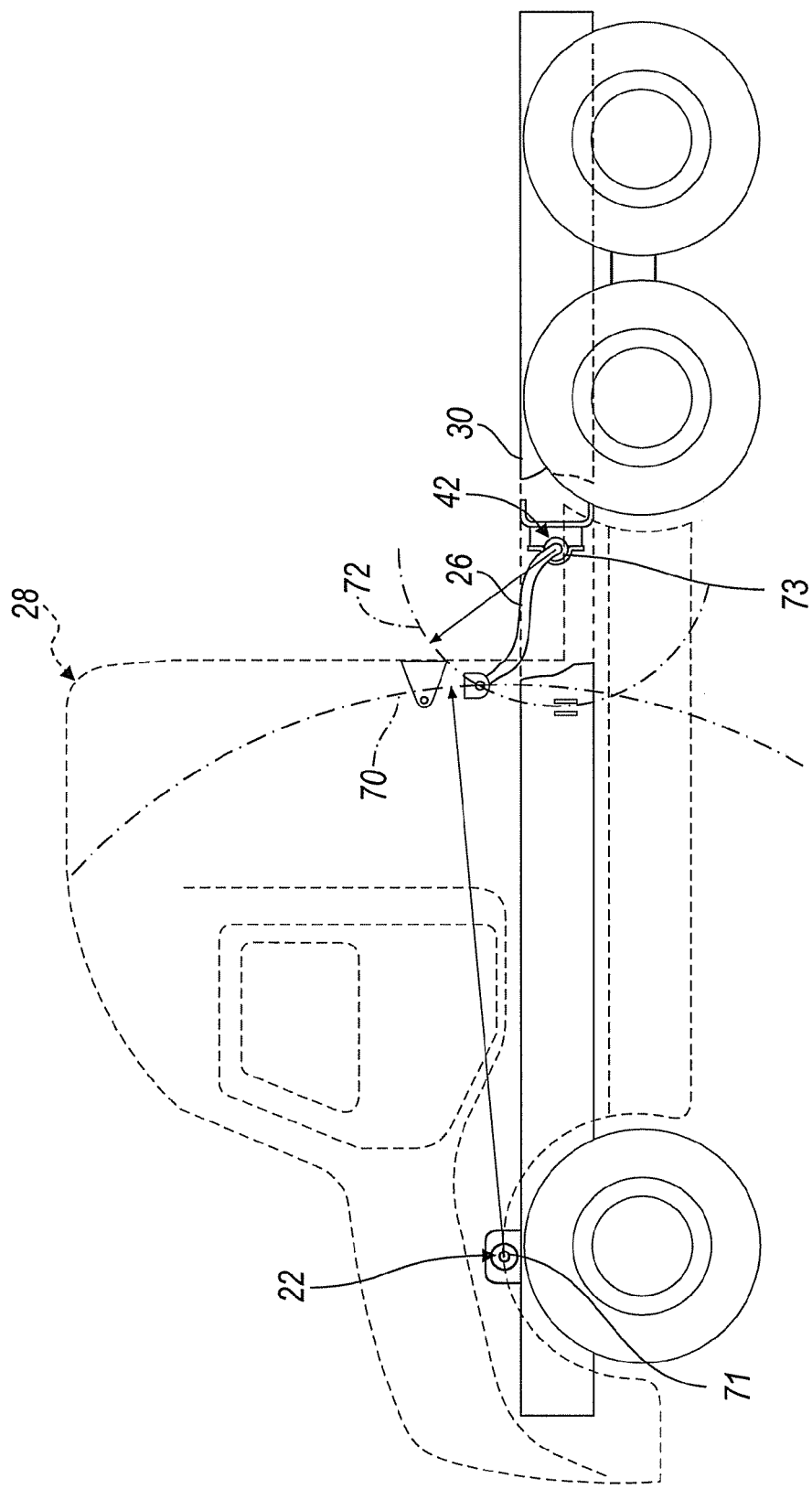
FIG. 5 is a side view of the vehicle of FIG. 1 with the air spring over shock removed for clarity.

As can be seen in FIG. 5, the cab 28 rotates relative to the frame 30 on an arc 70 centered on a laterally extending axis 71 which extends through the front couplings 22, where the front couplings 22 are positioned between the cab 28 and the frame 30. The motion control link 26 also rotates relative to the frame 30 on an arc 72 centered on a laterally extending axis 73 through the base 38 and the couplings 42. These two arcs 70 and 72 intersect each other.

In order to accommodate rotation around both axes 71 and 73, elastomeric bushing members 54 of couplings 48 can include one or more internal voids 74, as shown in FIG. 4. The distance between the laterally extending axis 73 through base 38 and couplings 42 and fixed inner coupling member 50 defines a radius, or an arc length, of arc 72. This arc length (i.e., radius) changes in order to accommodate simultaneous rotation around both axes 71 and 73, and the internal voids 74 are positioned in order to accommodate this change in arc length. For example, the internal voids 74 can be positioned to allow the inner coupling member 50 of couplings 48 to move along the radius of the arc 72 to allow the arc length to change by lengthening or shortening it. Thus, the internal voids 74 can be positioned primarily on opposing sides of a plane passing through the center of the couplings 48 and that is normal to the radius of arc 72.

Motion control link 26 can also provide tuned torsional (or roll) motion control of the cab 28 relative to the frame 30. For example, internal voids 74 in elastomeric bushing member 54 between inner bushing member 50 and outer collar member 52 can be included to provide the tuned torsional motion control of the cab 28 relative to the frame 30. Thus, the internal voids 74 can be positioned to enable the cab 28 to move up at one coupling 48 on one side of the cab 28 while the other side of the cab 28 moves down at the other coupling 48. In this manner it can be possible for the coupling ends of the arms 40 of the motion control link 26 to remain laterally aligned with each other, while providing the tuned torsional motion control.

As an alternative or in addition to the internal voids 74, torsional motion control can be provided by selecting, the material, dimensions, or both of the motion control link 26 to enable the arms 40 to rotate in opposite directions relative to each other so that the coupling ends of the arms 40 move vertically relative to each other. In other words, the end of one arm 40 moves up while the end of the other arm 40 simultaneously moves down.

It should be apparent from the above discussion, that the motion control link 26 also provides fore and aft motion control at the rear of the cab 28. In addition, the motion control link 26 is sufficiently strong, and is joined to both the cab 28 and the frame 30 with couplings 48 and 42, respectively, that are sufficiently strong that the motion control link 26 maintains the cab 28 to frame 30 coupling during a 200 impact as required to meet current crashworthiness testing. In such cases, no additional couplings between the cab 28 and the frame 30 are needed in order to meet this impact standard.

Front couplings 22 can provide tuned vertical motion control at the front of the cab 28. For example, similar to couplings 48, front couplings 22 can include an elastomeric bushing member 54 between an inner annular member 50 and an elongated aperture 58. Bushing member 54 can include voids 74 between the annular member 50 and the elongated aperture 58. To provide the tuned vertical motion control at the front of the cab 28, the internal voids 74 can be positioned primarily on opposing sides of a horizontal plane passing through the center of the couplings 22. Alternatively or additionally, the internal voids 74 of front couplings 22 can be positioned primarily on opposing sides of a plane passing through the center of the couplings 48 and that is normal to the radius of arc 70.

Front couplings 22 may also provide tuned lateral motion control at the front of the cab 28. For example, front couplings 22 can include protruding annular member 66 with voids 68 sandwiched between two annular surfaces 56 and 60 similar to that illustrated in FIG. 4. Thus, tuned lateral motion control of the cab 28 relative to the frame 30 can be at the front of the cab 28 by the front couplings 22 (similar to that described above for the rear of the cab 28 via the couplings 48 of the motion control link 26).

Figure 6:
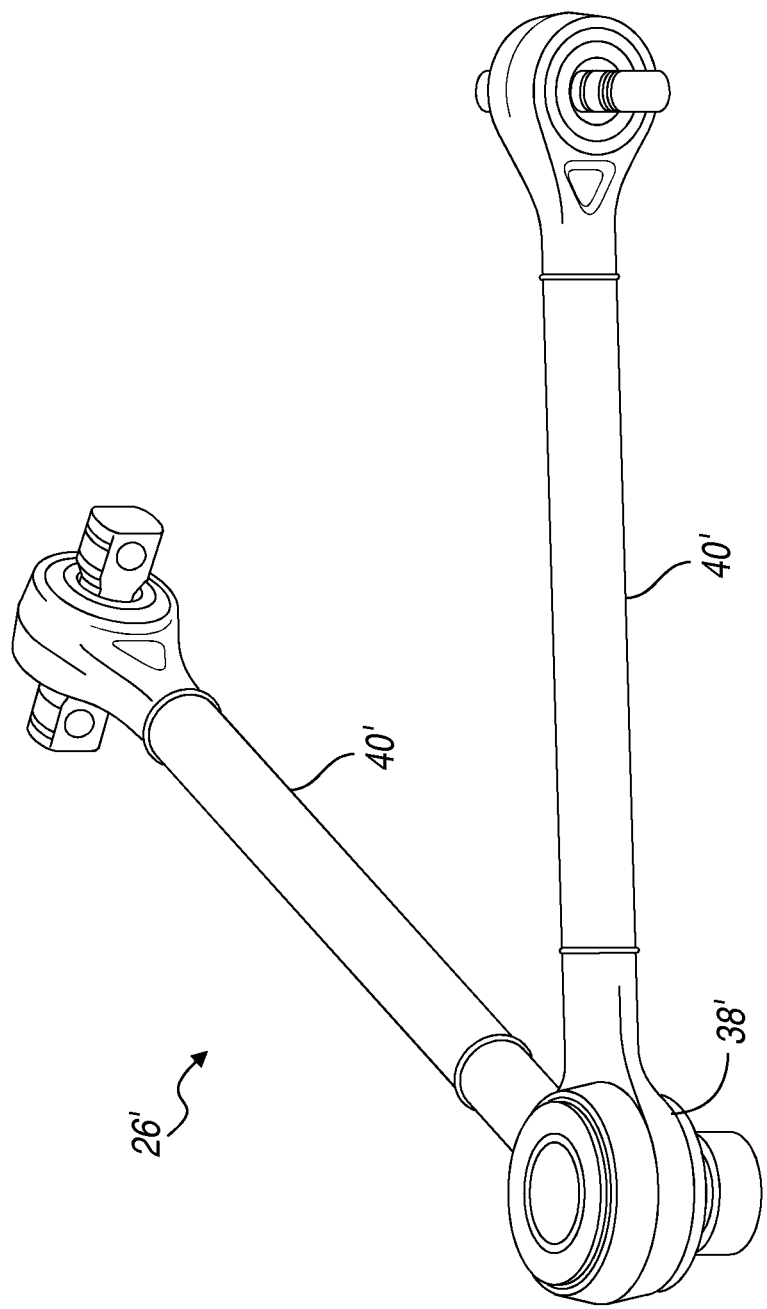
FIG. 6 is a perspective view of an alternative motion control link for use in a driver's cab suspension system in accordance with the present disclosure.

Many modifications to the embodiment specifically described above will be apparent to one of ordinary skill in the art. For example, as illustrated in FIG. 6, motion control link 26' can have a V-shaped configuration with the two arms 40' extending at an angle from a circular base 38'. The motion control link 26 can also be reversed so that the arms 40 are joined to the frame 30 via couplings 48 and the base 38 is joined to the rear of the cab 28 via couplings 42. Alternatively or additionally, the couplings 42 can be used to couple the motion control link 26 to the rear of the cab 28, and the couplings 48 can be used to couple the motion control link 26 to the frame 30. As another example, all of the couplings between the motion control link 26 and the vehicle can have a configuration similar to couplings 48, e.g., with each protruding generally annular member 66 engaging a corresponding fixed surface 60 of the vehicle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. Similarly, any of the various individual features identified in any of the appended claim(s) can be individually combined with any possible combination of individual features in any other claim(s). Such variations are not to be regarded as a departure from the disclosure or claims, and all such modifications and possible combinations of features are expressly included within the scope of the disclosure and claims.

What is claimed is:
1. A driver's cab suspension comprising:
  a pair of front couplings between a front of the cab and a pair of frame rails of a vehicle frame, the front couplings being aligned along a front laterally extending axis around which the cab rotates in a front coupling arc;
  a pair of rear air springs over shocks coupling a rear of the cab to the vehicle frame;
  a motion control link comprising a central base and pair of arms extending longitudinally from the central base;
  a rear base coupling that directly couples the central base to one of the vehicle frame and a rear of the cab;

a rear arm coupling for each arm that directly couples the arm to the other of the vehicle frame and the rear of the cab;

wherein the rear base coupling and the rear arm coupling essentially restrict lateral movement of the motion control link and permit tuned lateral movement of the frame relative to the rear of the cab to provide lateral motion control at the rear of the cab;

wherein the motion control link is rotationally coupled between the vehicle frame and the rear of the cab with the arms rotating about a rear laterally extending axis adjacent the frame and defining a motion control link arc that intersects the front coupling arc;

wherein at least one of the rear base member coupling and the rear arm couplings comprise a rear elastomeric bushing member enabling the cab to simultaneously rotate around both the front laterally extending axis and the rear laterally extending axis as the rear of the cab moves vertically to provide vertical motion control of the rear of the cab together with the air springs over shocks; and wherein at least one of the rear base coupling and the rear arm couplings comprises a laterally protruding elastomeric portion projecting laterally toward one of the vehicle frame rails, and engaging against a vehicle surface, to progressively limit lateral movement of the rear of the cab relative to the frame.

2. The driver's cab suspension according to claim 1, wherein each of the front couplings comprises a front elastomeric bushing member enabling the front of the cab to move vertically relative to the frame to provide vertical motion control of the front of the cab.

3. The driver's cab suspension according to claim 2, wherein each of the front elastomeric bushing members enable the front of the cab to move laterally relative to the frame to provide lateral motion control of the front of the cab.

4. The driver's cab suspension according to claim 1, wherein the rear elastomeric bushing member provides torsional motion control at the rear of the cab together with the air springs over shocks, without requiring one arm of the motion control link to rotate in a first direction relative to the base while the other arm of the motion control link rotates in a second direction relative to the base that is opposite to the first direction.

5. The driver's cab suspension according to claim 1, wherein the motion control link comprises one of a generally C-shaped member with the base extending laterally and the pair of arms extending from opposite ends of the base, and a generally V-shaped member with the base at the apex of the V and the pair of arms extending angularly from the base.

6. The driver's cab suspension according to claim 1, wherein the rear base coupling comprises a clamshell housing clamping an annular bushing around the base at a predetermined compression that restricts axial movement of the base relative to the clamshell housing.

7. The driver's cab suspension according to claim 1, further comprising a driver selectable electronic controller operably coupled to the pair of rear air springs over shocks to provide electronic control of the pair of rear air springs over shocks.

8. A driver's cab suspension comprising:
a pair of front couplings between a front of the cab and a pair of vehicle frame rails of a vehicle frame, the front couplings being aligned along a front laterally extending axis around which the cab rotates along a rearwardly extending coupling arc;
a pair of rear air springs over shocks coupling a rear of the cab to the vehicle frame;
a motion control link comprising a laterally extending base and pair of arms extending forwardly from the base;
a rear frame coupling that rotationally couples the base to the vehicle frame while essentially restricting lateral movement of the motion control link relative to the frame;
a rear cab coupling for each arm that rotationally couples the arm to a rear of the cab and comprises a rod member coupled to a fixed cab member, and the rod member extending through an elastomeric cab bushing member, the elastomeric cab bushing member having a protruding portion protruding laterally toward one of the frame rails, and wherein engagement between the protruding portion of the elastomeric cab bushing member and a surface of the fixed cab member progressively limits lateral movement of the rear of the cab relative to the motion control link;
wherein the motion control link, the rear frame coupling, and the rear cab coupling, in combination, provides tuned lateral motion control at the rear of the cab relative to the frame;
wherein an arc length is defined between a laterally extending central axis of the base and a laterally extending central axis of the rod member, and the elastomeric cab bushing member of each rear arm coupling comprises at least one void enabling the arc length to change sufficiently to accommodate for simultaneous rotation of the cab around both the front laterally extending axis and the rear laterally extending axis as the rear of the cab moves vertically to provide tuned vertical motion control of the rear of the rear of the cab together with the air springs over shocks.

9. The driver's cab suspension according to claim 8, wherein each of the front couplings comprises a front elastomeric bushing member comprising at least one void enabling the front of the cab to move vertically relative to the frame to provide vertical motion control at the front of the cab.

10. The driver's cab suspension according to claim 8, wherein the rear frame coupling comprises a elastomeric frame bushing member, and wherein one of the elastomeric frame bushing member, the elastomeric cab bushing members, or both, comprises at least one torsional void enabling sufficient torsional rotation of the cab relative to the frame to provide tuned torsional motion control at the rear of the cab without the need for opposing rotation about the rear laterally extending axis of one arm relative to the other arm.

11. The driver's cab suspension according to claim 8, wherein the rear frame coupling comprises a clamshell housing clamping an annular bushing around the base at a predetermined compression that essentially restricts axial movement of the base relative to the clamshell housing.

12. The driver's cab suspension according to claim 8, wherein the motion control link comprises a generally C-shaped member with the base extending laterally and the pair of arms extending from opposite ends of the base.

13. The driver's cab suspension according to claim 8, further comprising a driver selectable electronic controller operably coupled to the pair of rear air springs over shocks to provide electronic control of the pair of rear air springs over shocks.

14. A driver's cab suspension comprising:
a pair of front couplings between a front of the cab and a vehicle frame, each said front coupling comprising a laterally extending front rod member coupled to a front fixed cab member, each said front rod member extending through a front elastomeric cab bushing member, wherein each said elastomeric front elastomeric cab bushing member comprises at least one void in a space between the laterally extending front rod member and an outer collar of the respective front coupling that enables tuned vertical movement of the front of the cab relative to the frame;

a pair of rear air spring over shocks coupling a rear of the cab to the vehicle frame;

a motion control link comprising a base and pair of arms extending from the base;

a base coupling that rotationally couples the base to one of a rear of the cab and the vehicle frame and essentially restricts lateral movement of the motion control link relative to the frame and the one of the rear of the cab and the vehicle frame;

a rear arm coupling between a distal end of each said arm and the other of the one of the rear of the cab and the vehicle frame, each said rear arm coupling comprising a laterally extending rear rod member coupled to a rear fixed member of the other of the one of the rear of the cab and the vehicle frame, each said rear rod member extending through an elastomeric rear bushing member, wherein a generally annular protruding portion of each said elastomeric rear bushing member engages an opposing surface of the rear fixed member to progressively resist lateral movement of the rear of the cab relative to the vehicle frame as the generally annular protruding portion is compressed.

15. The driver's cab suspension according to claim 14, wherein each said elastomeric front bushing member comprises a generally annular protruding portion with exterior voids engaging an opposing surface of the front fixed cab member to progressively resist lateral movement at the front of the cab relative to the vehicle frame as the generally annular protruding portion is compressed.

16. The driver's cab suspension according to claim 14, wherein each said elastomeric rear bushing member comprises at least one void in a space between the laterally extending rear rod member and an outer collar of the respective rear arm coupling that enables tuned vertical movement of the rear of the cab relative to the frame.

17. The driver's cab suspension according to claim 14, wherein the rear rod members define a common, laterally extending, central axis, and wherein a distance between the common central axis and a central axis of the base increases and decreases as the rear of the cable moves vertically relative to the frame.

18. The driver's cab suspension according to claim 14, further comprising a driver selectable electronic controller operably coupled to the pair of rear air springs over shocks to provide electronic control of the pair of rear air springs over shocks.

19. The driver's cab suspension according to claim 14, wherein the base coupling comprises a clamshell housing clamping an annular bushing around the base at a predetermined compression that essentially restricts axial movement of the base relative to the clamshell housing.

\* \* \* \* \*